United States Patent
Yang et al.

(10) Patent No.: US 11,445,486 B2
(45) Date of Patent: *Sep. 13, 2022

(54) METHOD FOR TRANSMITTING WIRELESS SIGNALS AND APPARATUS THEREFOR

(71) Applicant: LG ELECTRONICS INC., Seoul (KR)

(72) Inventors: Suckchel Yang, Seoul (KR); Kijun Kim, Seoul (KR); Yunjung Yi, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 22 days.

This patent is subject to a terminal disclaimer.

(21) Appl. No.: 16/914,047

(22) Filed: Jun. 26, 2020

(65) Prior Publication Data
US 2020/0337043 A1 Oct. 22, 2020

Related U.S. Application Data

(63) Continuation of application No. 16/517,537, filed on Jul. 19, 2019, now Pat. No. 10,701,675, which is a
(Continued)

(51) Int. Cl.
*H04W 72/04* (2009.01)
*H04W 72/12* (2009.01)
*H04L 5/00* (2006.01)

(52) U.S. Cl.
CPC ......... *H04W 72/0413* (2013.01); *H04L 5/005* (2013.01); *H04L 5/0053* (2013.01);
(Continued)

(58) Field of Classification Search
CPC ....... H04L 5/00; H04L 5/0053; H04L 5/0057; H04L 5/0078; H04L 5/0082;
(Continued)

(56) References Cited

U.S. PATENT DOCUMENTS

| 8,767,647 B2 | 7/2014 | Heo | H04L 5/001 370/329 |
| 8,804,645 B2 | 8/2014 | Kim | H04W 72/0413 370/329 |

(Continued)

FOREIGN PATENT DOCUMENTS

WO 2011132993 10/2011

OTHER PUBLICATIONS

Ericsson: "Remaining details of UCI transmission on PUSCH," 3GPP TSG RAN WG1 Meeting #83, Nov. 15-22, 2015, R1-157287.
(Continued)

*Primary Examiner* — Ahmed Elallam
(74) *Attorney, Agent, or Firm* — Dentons US LLP

(57) ABSTRACT

The present invention relates to a wireless communication system and, more particularly, to a method and an apparatus therefor, the method comprising: a step of acquiring a periodically allocated PUSCH resource, wherein the periodically allocated PUSCH resource is used for a transmission of a first PUSCH; a step of performing a procedure for transmitting uplink control information if transmission of the uplink control information is required at the transmission timing of the first PUSCH; and a step of transmitting the uplink control information, wherein if an aperiodically allocated second PUSCH does not exist at the transmission timing of the first PUSCH, the uplink control information is transmitted via the first PUSCH, and if the aperiodically allocated second PUSCH exists at the transmission timing of the first PUSCH, the uplink control information is transmitted via the second PUSCH.

16 Claims, 10 Drawing Sheets

*: If there is not a normal PUSCH at the transmission timing of the first PUSCH, UCI is transmitted via the first PUSCH, and if there is the normal PUSCH at the transmission timing of the first PUSCH, UCI is transmitted via the normal PUSCH

Related U.S. Application Data continuation of application No. 15/775,640, filed as application No. PCT/KR2016/013038 on Nov. 11, 2016, now Pat. No. 10,397,906.

(60) Provisional application No. 62/303,316, filed on Mar. 3, 2016, provisional application No. 62/254,752, filed on Nov. 13, 2015.

(52) U.S. Cl.
CPC ....... H04L 5/0055 (2013.01); H04W 72/1268 (2013.01); *H04L 5/0007* (2013.01); *H04W 72/1284* (2013.01)

(58) Field of Classification Search
CPC ............... H04L 1/0073; H04L 1/1861; H04W 72/0413; H04W 72/1268; H04W 72/1278; H04W 72/1284
See application file for complete search history.

(56) References Cited

U.S. PATENT DOCUMENTS

| | | | |
|---|---|---|---|
| 8,958,370 B2 | 2/2015 | Noh | H04L 5/001 |
| 8,976,751 B2 | 3/2015 | Yang | H04W 24/10 370/329 |
| 9,030,957 B2 | 5/2015 | Seo | H04L 1/1861 |
| 9,143,297 B2 | 9/2015 | Liang | H04L 5/0053 |
| 9,210,695 B2 | 12/2015 | Kim | H04L 5/0042 |
| 9,253,765 B2 | 2/2016 | Nam | H04L 5/001 |
| 9,420,570 B2 | 8/2016 | Noh | H04L 5/001 |
| 9,450,714 B2 | 9/2016 | Hwang | H04L 1/0026 |
| 9,839,012 B2 | 12/2017 | Gao | H04L 5/0007 |
| 10,334,576 B2 | 6/2019 | Yin | H04L 1/1861 |
| 10,356,725 B2 | 7/2019 | Lin | H04L 5/0055 |
| 10,397,906 B2 | 8/2019 | Yang | H04L 5/0055 |
| 10,701,675 B2 * | 6/2020 | Yang | H04L 5/0055 |
| 10,716,069 B2 * | 7/2020 | Gao | H04W 52/367 |
| 2010/0098012 A1 | 4/2010 | Bala et al. | |
| 2010/0271970 A1 * | 10/2010 | Pan | H04L 1/0026 370/252 |
| 2013/0077593 A1 | 3/2013 | Han | H04L 1/0079 370/329 |
| 2013/0230004 A1 | 9/2013 | Nam | H04L 5/001 370/329 |
| 2013/0343261 A1 | 12/2013 | Gonsa et al. | |
| 2017/0215157 A1 | 7/2017 | Yang | H04B 7/26 |
| 2017/0373741 A1 | 12/2017 | Yang | H04L 1/18 |
| 2019/0082452 A1 | 3/2019 | Zheng | H04W 72/1268 |

OTHER PUBLICATIONS

NTT DoCoMo, Inc.: "Remaining aspects of UCI transmission on PUSCH," 3GPP TSG RAN WG1 Meeting #83, Nov. 15-22, 2015, R1-157232.

* cited by examiner

METHOD FOR TRANSMITTING WIRELESS SIGNALS AND APPARATUS THEREFOR

This application is a Continuation of U.S. patent application Ser. No. 16/517,537, filed on Jul. 19, 2019, now U.S. Pat. No. 10,701,675, which is a Continuation of U.S. patent application Ser. No. 15/775,640, filed on May 11, 2018, now U.S. Pat. No. 10,397,906, which is a National Stage Application of International Application No. PCT/KR2016/013038, filed on Nov. 11, 2016, which claims the benefit of U.S. Provisional Application No. 62/254,752, filed on Nov. 13, 2015 and U.S. Provisional Application No. 62/303,316, filed on Mar. 3, 2016, all of which are hereby incorporated by reference in their entirety for all purposes as if fully set forth herein.

TECHNICAL FIELD

The present invention relates to a wireless communication system, and more specifically, to method for transmitting wireless signals and an apparatus therefor.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

An object of the present invention devised to solve the problem lies in a method for efficiently transmitting wireless signals in a wireless communication system and an apparatus therefor.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to one aspect of the present invention, a method for transmitting uplink control information by a UE in a wireless communication system includes: acquiring a periodically allocated physical uplink shared channel (PUSCH) resource, the periodically allocated PUSCH resource being used to transmit a first PUSCH; performing a procedure for transmitting uplink control information when the uplink control information needs to be transmitted at a transmission timing of the first PUSCH; and transmitting the uplink control information, wherein the uplink control information is transmitted through the first PUSCH when an aperiodically allocated second PUSCH does not exist at the transmission timing of the first PUSCH and the uplink control information is transmitted through the second PUSCH when the aperiodically allocated second PUSCH exists at the transmission timing of the first PUSCH.

According to another aspect of the present invention, a UE used in a wireless communication system includes: a radio frequency (RF) unit; and a processor, wherein the processor is configured: to acquire a periodically allocated physical uplink shared channel (PUSCH) resource, the periodically allocated PUSCH resource being used to transmit a first PUSCH; to perform a procedure for transmitting uplink control information when the uplink control information needs to be transmitted at a transmission timing of the first PUSCH; and to transmit the uplink control information, wherein the uplink control information is transmitted through the first PUSCH when an aperiodically allocated second PUSCH does not exist at the transmission timing of the first PUSCH and the uplink control information is transmitted through the second PUSCH when the aperiodically allocated second PUSCH exists at the transmission timing of the first PUSCH.

Preferably, the first PUSCH is used to carry information of a first type which requires low latency.

Preferably, the first PUSCH may be used to carry uplink shared channel (UL-SCH) data having transmission control protocol acknowledgement (TCP-ACK).

Preferably, the second PUSCH may be used to transmit retransmitted data.

Preferably, the second PUSCH may be used to carry channel state information (CSI) without UL-SCH data.

Advantageous Effects

According to the present invention, wireless signals can be efficiently transmitted in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
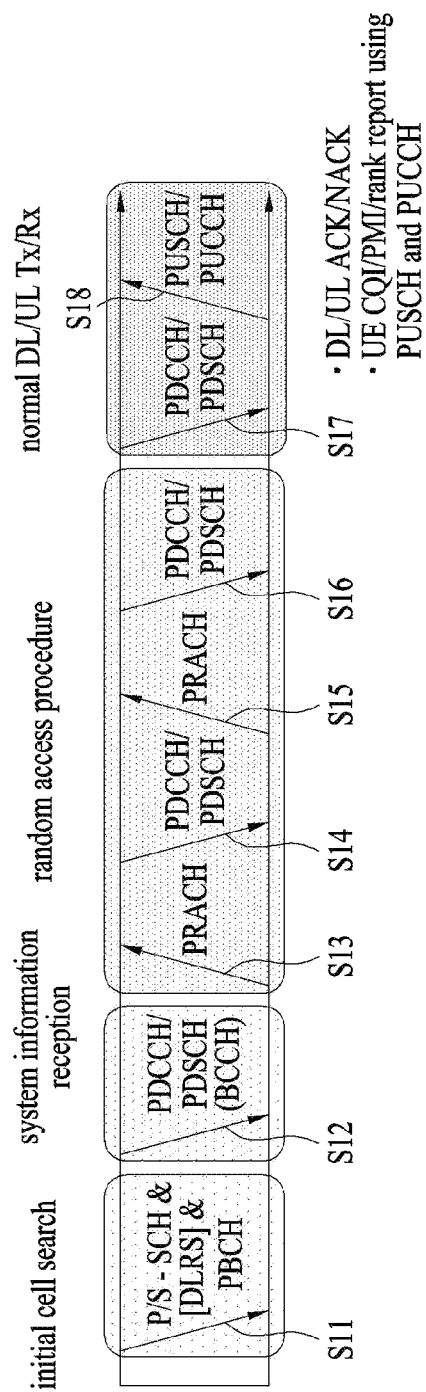
FIG. 1 is a conceptual diagram illustrating physical channels used in a 3GPP LTE system acting as an exemplary mobile communication system and a general method for transmitting a signal using the physical channels.

FIG. 1 illustrates physical channels used in a 3GPP LTE system and a signal transmission method using the same.

When powered on or when a UE initially enters a cell, the UE performs initial cell search involving synchronization with a BS in step S11. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

The UE may perform a random access procedure to access the BS in steps S13 to S16. For random access, the UE may transmit a preamble to the BS on a physical random access channel (PRACH) S13 and receive a response message for preamble on a PDCCH and a PDSCH corresponding to the PDCCH S14. In the case of contention-based random access, the UE may perform a contention resolution procedure by further transmitting the PRACH S15 and receiving a PDCCH and a PDSCH corresponding to the PDCCH S16.

After the foregoing procedure, the UE may receive a PDCCH/PDSCH S17 and transmit a physical uplink shared channel (PUSCH)/physical uplink control channel (PUCCH) S18, as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
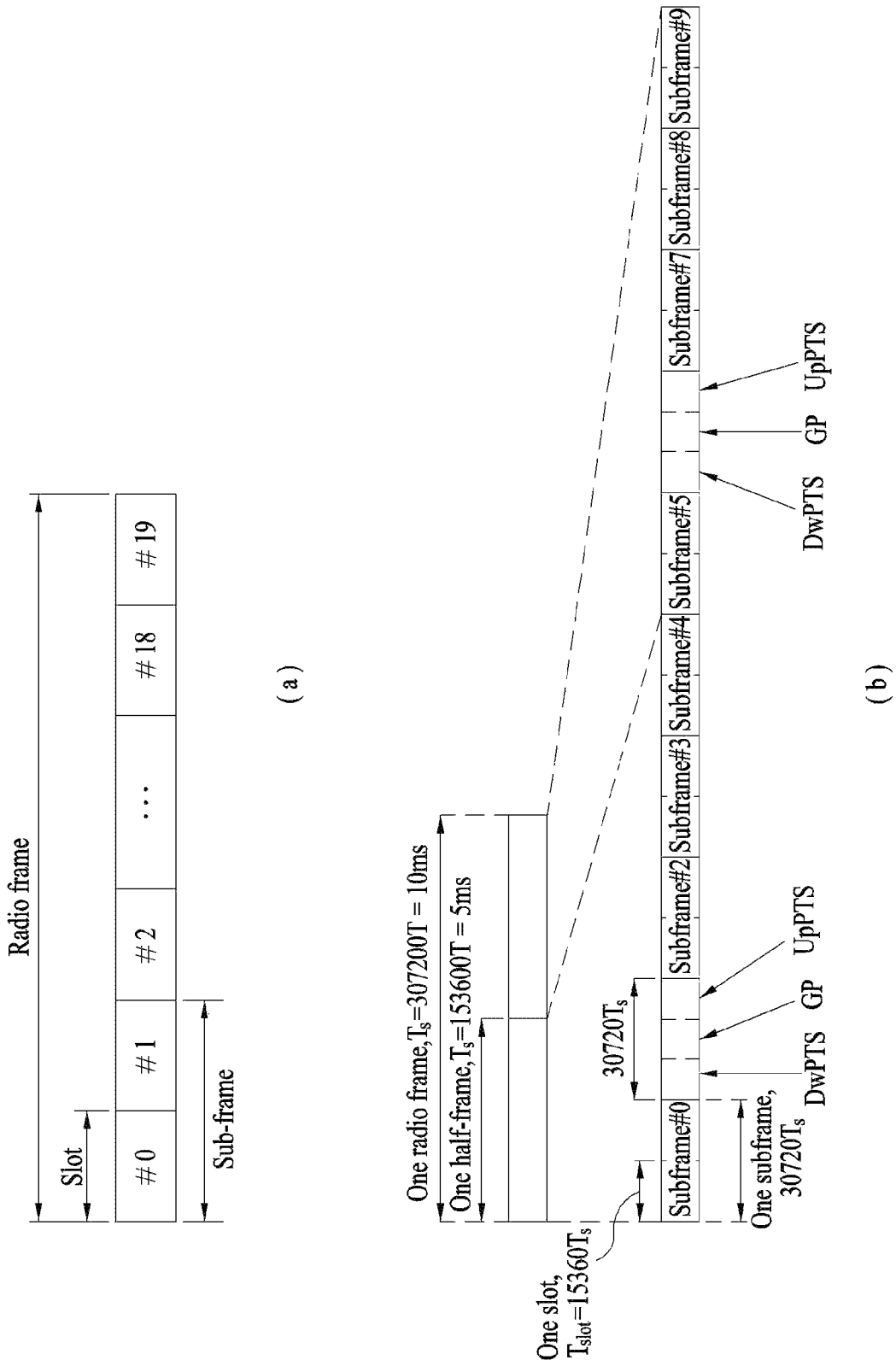
FIG. 2 is a diagram illustrating a structure of a radio frame.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
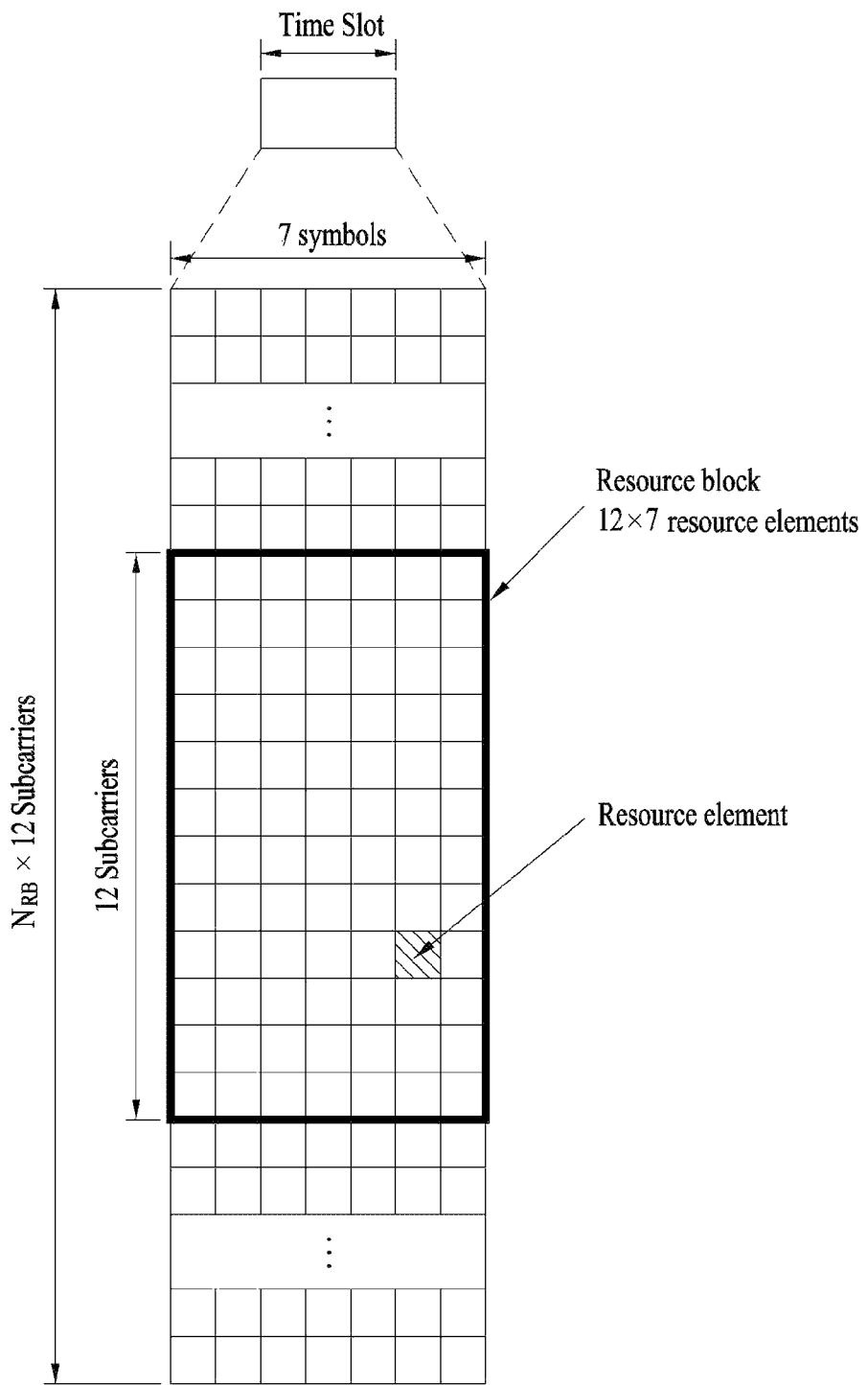
FIG. 3 exemplarily shows a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7 REs. The number $N^{DL}$ of RBs included in the downlink slot depends on a downlink transmit bandwidth. The structure of an uplink slot may be same as that of the downlink slot.

Figure 4:
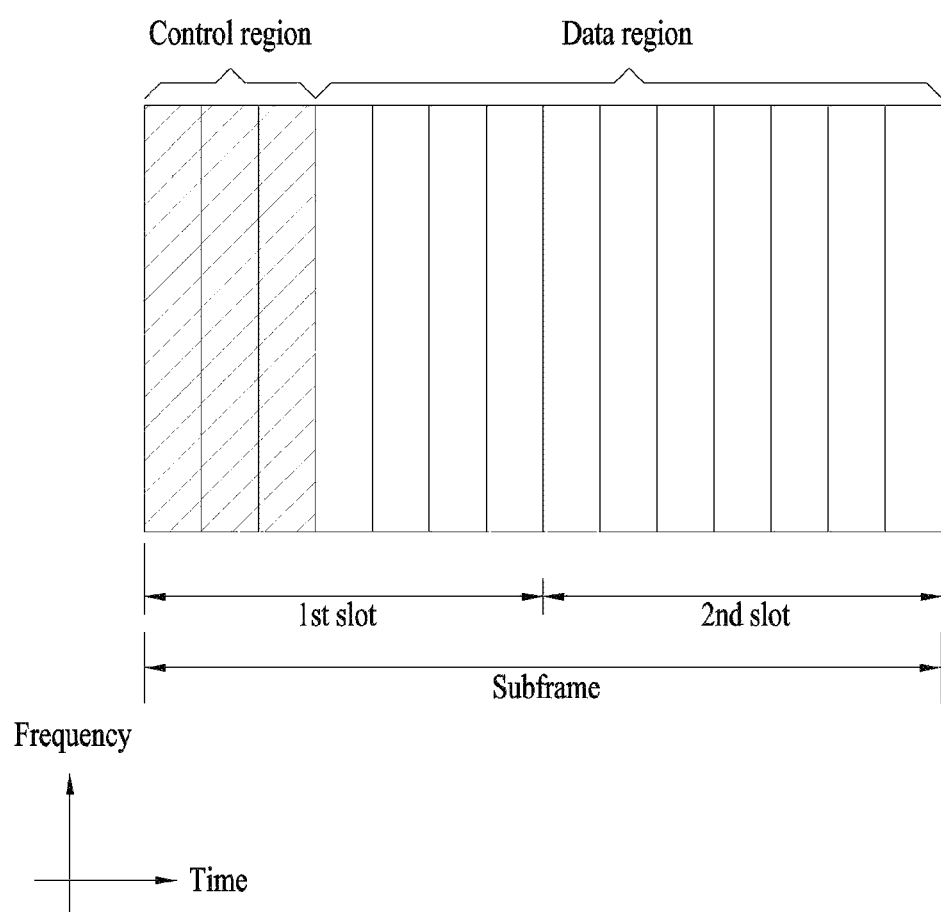
FIG. 4 illustrates a downlink frame structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI, and generally, a plurality of PDCCHs is transmitted in a subframe. Each PDCCH is transmitted using one or more CCEs. One CCE corresponds to nine REGs, and one REG corresponds to four REs. Four QPSK symbols are mapped to each REG. The resource element occupied by the reference signal is not included in the REG. Thus, the number of REGs within a given OFDM symbol depends on the presence or absence of a cell-specific reference signal. The REG concept is also used for other downlink control channels (i.e., PDFICH and PHICH). As shown in Table 2, four PDCCH formats are supported.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by the BS according to the channel state. For example, one CCE may be required for a PDCCH for a UE (for example, adjacent to the BS) having a good downlink channel. However, in case of a PDCCH for a UE (for example, located near the cell edge) having a poor channel, eight CCEs may be required to obtain sufficient robustness. Additionally, the power level of the PDCCH may be adjusted according to the channel state.

In LTE, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. One PDCCH candidate corresponds to 1, 2, 4 or 8 CCEs according to the CCE set level. The BS transmits an actual PDCCH (DCI) on a PDCCH candidate in a search space and the UE monitors the search space to detect the PDCCH (DCI). Specifically, the UE attempts blind decoding (BD) on the PDCCH candidates in the search space.

In LTE, SSs for respective PDCCH formats may have different sizes. A dedicated SS and a common SS are defined. A dedicated SS (or UE-specific SS (USS)) and a common SS (Common SS (CSS)) are defined. The dedicated search space is configured for each individual UE, and all UEs are provided with information about the range of the common SS. The dedicated SS and the common SS may overlap for a given UE.

Since the SSs are small in size and may overlap each other, the base station may not be able to find a CCE resource for sending a PDCCH to all desired UEs in a given subframe. This is because CCE resources have already been allocated to other UEs, and there may be no more CCE resources for a specific UE in the search space of the specific UE (blocking). In order to minimize the possibility of blocking to be continued in the next subframe, a UE-specific hopping sequence is applied to the start position of the dedicated SS. Table 3 shows the sizes of common and dedicated SSs.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To put the computational load according to attempts of blind decoding under control, the UE does not simultaneously search all defined DCI formats. In general, in a dedicated search space, the UE always searches formats 0 and 1A. Formats 0 and 1A have the same size and are distinguished by flags in the message. In addition, the UE may be further required to receive another format (i.e., format 1, 1B or 2 depending on the PDSCH transmission mode set by the base station). In the common search space, the UE searches formats 1A and 1C. In addition, the UE may be configured to search format 3 or 3A. Formats 3 and 3A have the same size as in the case of format 0/1A, and are distinguished according to whether they have a CRC scrambled with another (common) identifier. Transmission modes and information content of DCI formats for configuring a multi-antenna technology are as follows.

Transmission mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals DCI format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an uplink subframe structure used in LTE.

Figure 5:
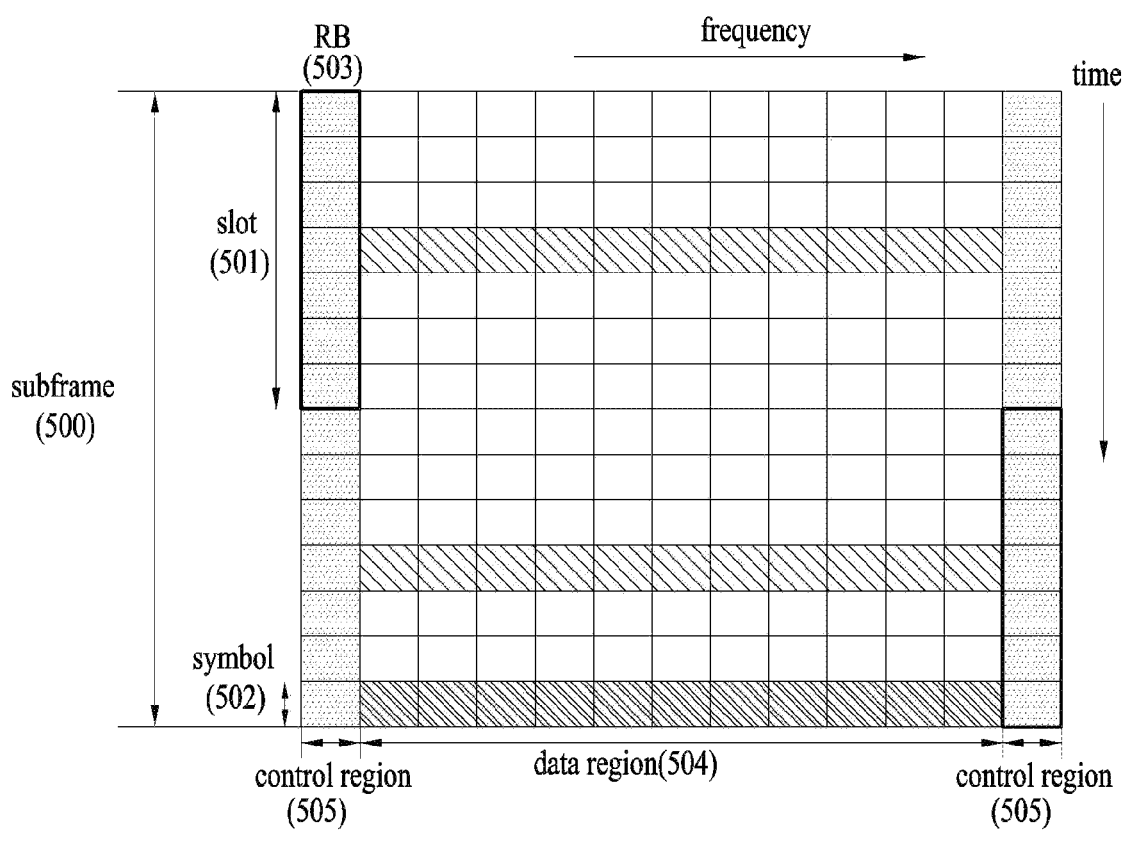
FIG. 5 illustrates an uplink subframe structure.

Referring to FIG. 5, a subframe 500 includes two 0.5 ms slots 501. When a normal CP is used, each slot includes 7 symbols 502 each corresponding to an SC-FDMA symbol. A resource block 503 is a resource allocation unit corresponding to 12 subcarriers in the frequency domain and to a slot in the time domain. The uplink subframe is divided into a data region 504 and a control region 505. The data region refers to a communication resource used for a UE to transmit data such as audio data, packets, etc. and includes a PUSCH (physical uplink shared channel). The control region refers to a communication resource used for the UE to transmit uplink control information (UCI) and includes a PUCCH (physical uplink control channel).

The PUCCH can be used to transmit the following control information.

SR (scheduling request): This is information used to request a UL-SCH resource and is transmitted using On-Off Keying (OOK) scheme.

HARQ ACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ-ACK response includes positive ACK (simply, ACK), negative ACK (NACK), DTX or NACK/DTX. Here, HARQ-ACK is used interchangeably with HARQ ACK/NACK and ACK/NACK.

CSI (channel state information): This is feedback information about a downlink channel. Feedback information regarding multiple input multiple output (MIMO) includes rank indicator (RI) and precoding matrix index (PMI). 20 bits are used for each subframe.

The quantity of control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE(-A).

TABLE 4

| PUCCH format | UCI (Uplink Control Information) |
| --- | --- |
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

An SRS is transmitted through the last SC-FDMA symbol of the subframe (506). SRSs of multiple UEs, transmitted through the same SC-FDMA symbol, can be discriminated according to frequency position/sequence. The SRS is transmitted aperiodically or periodically.

In LTE-A, there are two methods of transmitting UCI and UL-SCH data at the same time. The first method is to transmit the PUCCH and the PUSCH at the same time, and the second method is to multiplex the UCI in the PUSCH as in legacy LTE. Whether the PUCCH and the PUSCH are allowed to be simultaneously transmitted may be set by a higher layer. When simultaneous transmission of PUCCH and PUSCH is enabled, the first method is used. When simultaneous transmission of PUCCH and PUSCH is disabled, the second method is used. The legacy LTE UEs cannot transmit PUCCH and PUSCH at the same time. Accordingly, when UCI (e.g., CQI/PMI, HARQ-ACK, RI, etc.) transmission is required in a subframe in which the PUSCH is transmitted, the method of multiplexing UCI in the PUSCH region is used. For example, when HARQ-ACK is to be transmitted in a subframe to which PUSCH transmission is allocated, the UE multiplexes the UL-SCH data and the HARQ-ACK before DFT-spreading, and transmits the control information and the data together on the PUSCH.

Figure 6:
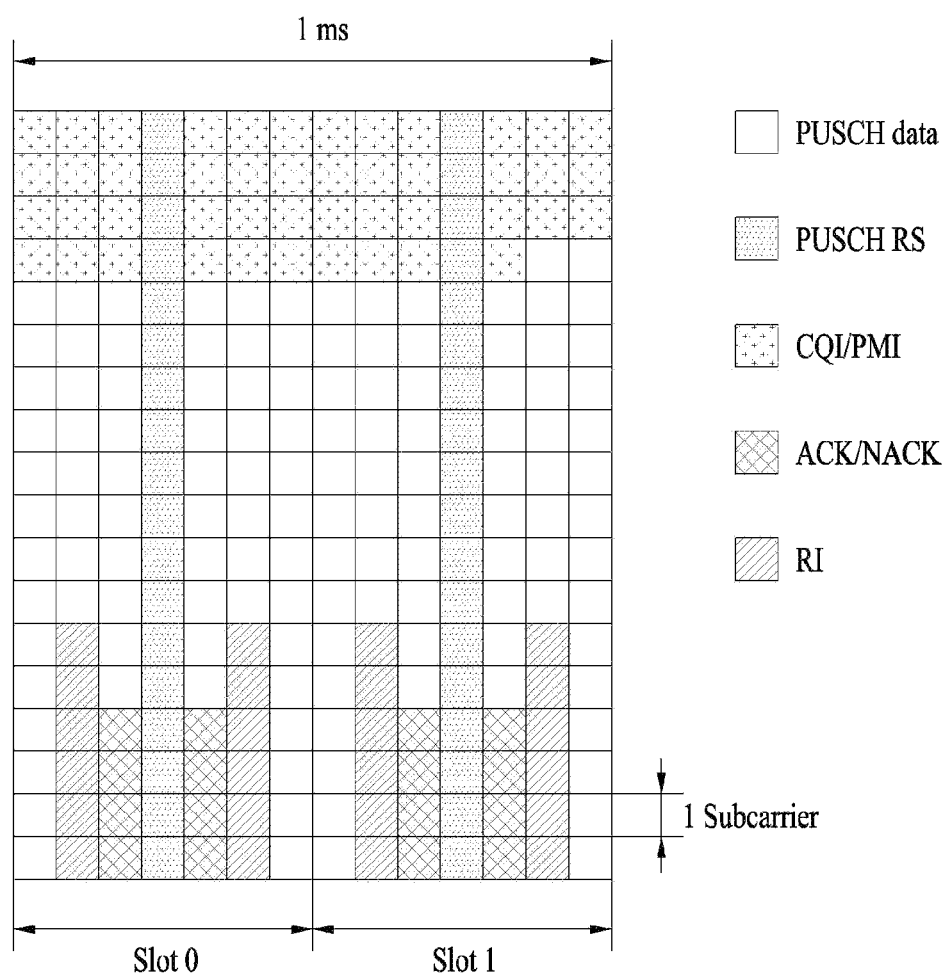
FIG. 6 is a conceptual diagram illustrating that control information and UL-SCH data are multiplexed on a Physical Uplink Shared CHannel (PUSCH).

FIG. 6 is a conceptual diagram illustrating that control information and UL-SCH data are multiplexed on a PUSCH. When transmitting control information in a subframe to which PUSCH transmission is allocated, the UE simultaneously multiplexes control information (UCI) and UL-SCH data prior to DFT spreading. The control information (UCI) includes at least one of CQI/PMI, HARQ ACK/NACK and RI. The number of REs used for transmission of each of CQI/PMI, ACK/NACK and RI is dependent upon Modulation and Coding Scheme (MCS) and offset values assigned for PUSCH transmission. The offset values allow different coding rates according to control information, and are semi-statically established by a higher layer (e.g., RRC) signal. UL-SCH data and control information are not mapped to the same RE. Control information is mapped to be contained in two slots of the subframe.

Referring to FIG. 6, CQI and/or PMI (CQI/PMI) resources are located at the beginning part of UL-SCH data resources, are sequentially mapped to all SC-FDMA symbols on one subcarrier, and are finally mapped in the next subcarrier. CQI/PMI is mapped from left to right within each subcarrier (i.e., in the direction of increasing SC-FDMA symbol index). PUSCH data (UL-SCH data) is rate-matched in consideration of the amount of CQI/PMI resources (i.e., the number of encoded symbols). The modulation order identical to that of UL-SCH data may be used in CQI/PMI. ACK/NACK is inserted into some resources of the SC-FDMA mapped to UL-SCH data through puncturing. ACK/NACK is located close to RS, fills the corresponding SC-FDMA symbol from bottom to top (i.e., in the direction of increasing subcarrier index) within the SC-FDMA symbol. In case of a normal CP, the SC-FDMA symbol for ACK/NACK is located at SC-FDMA symbols #2 and #5 in each slot as can be seen from FIG. 6. Irrespective of whether ACK/NACK is actually transmitted in a subframe, the coded RI is located next to the symbol for ACK/NACK.

In addition, control information (e.g., information about QPSK modulation) may be scheduled in a manner that the control information can be transmitted over PUSCH without UL-SCH data. Control information (CQI/PMI, RI and/or ACK/NACK) is multiplexed before DFT spreading so as to retain low CM (Cubic Metric) single-carrier characteristics. Multiplexing of ACK/NACK, RI and CQI/PMI is similar to that of FIG. 6. The SC-FDMA symbol for ACK/NACK is located next to RS, and resources mapped to the CQI may be punctured. The number of REs for ACK/NACK and the number of REs for RI are dependent upon reference MCS (CQI/PMI MCS) and offset parameter. The reference MCS is calculated on the basis of CQI payload size and resource allocation. Channel coding and rate matching to implement control signaling having no UL-SCH data are identical to those of the other control signaling having UL-SCH data.

Figure 7:
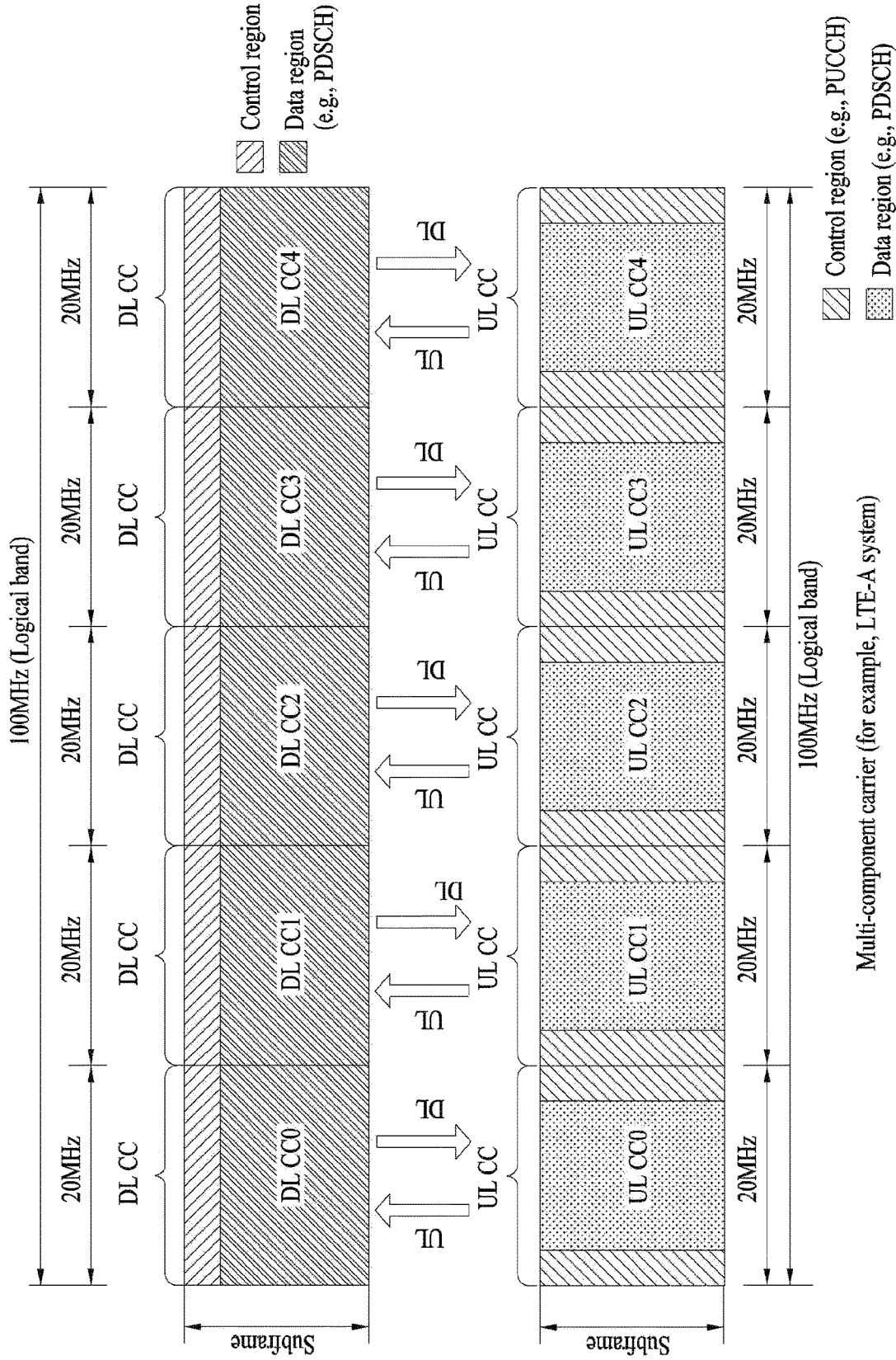
FIG. 7 exemplarily shows a carrier aggregation (CA) communication system.

FIG. 7 exemplarily shows a carrier aggregation (CA) communication system. The LTE-A system is designed to use a carrier aggregation or bandwidth aggregation technique using a plurality of UL/DL frequency blocks so as to use a wider frequency band. Each frequency block is transmitted using a component carrier (CC). The CC may be regarded as a carrier frequency (or center carrier, center frequency) for the frequency block.

Referring to FIG. 7, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

LTE-A uses the concept of a cell so as to manage radio resources. The cell is defined as a combination of DL resources and UL resources. Here, the UL resources are not an essential part. Accordingly, the cell can be configured with DL resources only, or DL resources and UL resources.

When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_Connected state and supports CA, one or more serving cells including a PCell and a SCell are provided. For CA, a network can configure one or more SCells for a UE that supports CA in addition to a PCell initially configured during a connection establishment procedure after an initial security activation procedure.

When cross-carrier scheduling (or cross-CC scheduling) is applied, a PDCCH for DL allocation can be transmitted through DL CC #0 and a PDSCH corresponding thereto can be transmitted through DL CC #2. For cross-CC scheduling, introduction of a Carrier Indicator Field (CIF) may be considered. The presence or absence of a CIF in a PDCCH can be set semi-statically and UE-specifically (or UE-group-specifically) according to higher layer signaling (e.g. RRC signaling). The base line of PDCCH transmission is summarized as follows.

CIF disabled: PDCCH on a DL CC allocates a PDSCH resource on the same DL CC or allocates a PUSCH resource on a linked UL CC.

CIF enabled: PDCCH on a DL CC can allocate a PDSCH or a PUSCH on a specific UL/DL CC from among a plurality of aggregated DL/UL CCs using the CIF.

When a CIF is present, a BS can allocate a PDCCH monitoring DL CC set in order to reduce BD complexity of a UE. The PDCCH monitoring DL CC set includes one or more DL CCs as part of aggregated DL CCs, and the UE detects/decodes a PDCCH only on DL CCs corresponding to the DL CC set. That is, if the BS schedules PDSCH/PUSCH for the UE, the PDCCH is transmitted only through a PDCCH monitoring DL CC set. The PDCCH monitoring DL CC set can be determined UE-specifically, UE-group-specifically or cell-specifically. The term "PDCCH monitoring DL CC" can be replaced by equivalent terms "monitoring carrier", "monitoring cell", etc. In addition, the term "aggregated CC" for a UE can be replaced by terms "serving CC", "serving carrier", "serving cell", etc.

Figure 8:
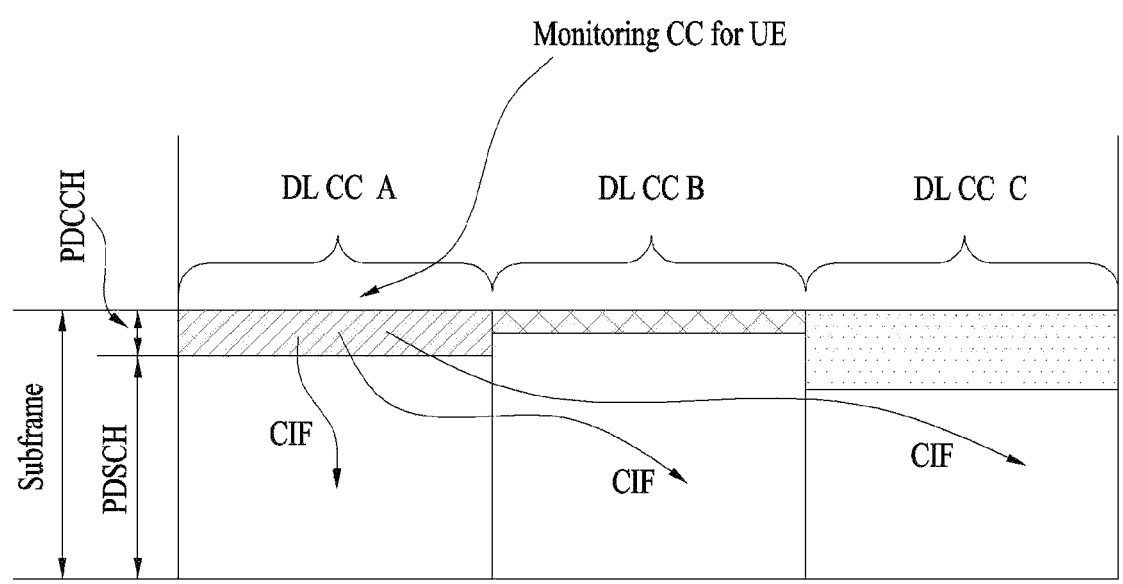
FIG. 8 exemplarily shows cross-carrier scheduling when a plurality of carriers are aggregated.

FIG. 8 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to a PDCCH monitoring DL CCs do not deliver PDCCHs.

Embodiment: Low Latency-Based Signal Transmission

Low latency-based signal transmission is considered as one of important technical requirements of systems following LTE-A. To achieve this, pre-grant-based UL scheduling, that is, a method by which UL (e.g., PUSCH) transmission resources (e.g., an RB set, an MCS, a transport block (TB) size, etc.) which are valid for a certain time duration are configured in advance and a UE rapidly transmit UL data using the resources (only when there is data to be transmitted) may be conceived. The UL transmission resources may be configured to have a specific period within the time duration. The period may be specified by a subframe period/offset. The period may be set by higher layer signaling (e.g., RRC signaling) or may have a predefined specific value. For convenience, a pre-grant-based PUSCH is referred to as a reserved-PUSCH. The reserved PUSCH may be useful for ACK (referred to as TCP-ACK hereinafter) information transmission for DL transmission control protocol (TCP) packet transmission which requires low latency, for example. Meanwhile, in a situation in which the reserved-PUSCH has been configured, a transmission timing of another UL signal, for example, UCI signaling including HARQ-ACK feedback for DL scheduling or a PUSCH scheduled on the basis of a normal dynamic UL grant, may coincide with a time in which the reserved-PUSCH is available. For convenience, a PUSCH based on a dynamic UL grant is referred to as a dynamic-PUSCH.

The present invention proposes a UE operation method suitable for a case in which transmission of a UL signal such as UCI feedback signaling or a dynamic-PUSCH is required in a situation in which a reserved-PUSCH has been configured. In the present invention, a PDCCH may include an enhanced PDCCH (EPDCCH) transmitted through an existing PDSCH region (data region in FIG. 4). Further, an uplink shared channel (UL-SCH) may refer to only TCP-ACK in the present invention. Here, the UL-SCH refers to a logical channel (i.e., UL-SCH) or UL-SCH data (e.g., UL SCH transport block (TB)) and may be used interchangeably depending on context. In addition, a PUSCH transmitted through semi-persistent scheduling (SPS) without a dynamic UL grant (referred to as SPS PUSCH hereinafter), a PUSCH non-adaptively retransmitted based on only PHCI-NACK, and the like may be collectively referred to as an only-PUSCH, and the dynamic-PUSCH may refer to only PUSCH scheduling for initial transmission except retransmission in the present invention.

The terms used in the present invention are summarized as follows.

Reserved-PUSCH: refers to a pre-grant-based PUSCH. UL transmission resources valid for a certain time duration are occupied/configured by a pre-grant and a UE can use the resources (only when there is data to be transmitted). The pre-grant can be signaled through a PDCCH (e.g., an RB set, an MCS, a TB size, etc.) and some information (e.g., a UL transmission resource period, a valid time duration, etc.) may be configured through higher layer signaling (e.g., RRC signaling). In the present description, reserved-PUSCH configuration/release may refer to presence or absence of a reserved-PUSCH resource or whether the reserved-PUSCH resource is used for data transmission within a certain time duration. In the latter case, a UE can assume the reserved-PUSCH resource to be configured/released temporarily (i.e., only for a corresponding subframe) depending on whether data transmission is performed within the certain time duration. The reserved-PUSCH can be used only for transmission of data (e.g., TCP-ACK) which requires low latency.

Normal PUSCH: This can refer to PUSCHs (i.e., non-reserved-PUSCH) other than the reserved-PUSCH in a broad sense. The normal PUSCH may be subdivided as follows and may refer to some of non-reserved-PUSCHs depending on definition.

Dynamic-PUSCH: refers to a dynamic UL grant based PUSCH. A UE performs a monitoring operation for receiving a UL grant per subframe and, upon detection of a UL grant, transmits a PUSCH after a predefined time (e.g., 4 ms). In the present invention, the dynamic-PUSCH may refer to only the initial PUSCH scheduled by a UL grant.

Only-PUSCH: refers to an SPS PUSCH or a PUSCH which is non-adaptively retransmitted (based on PHICH-NACK).

Although methods (1) to (3) will be independently described for convenience, they may be combined.

(1) Reserved-PUSCH Related Operation When Only UCI Exists Without UL-SCH Data

It is possible to assume that a higher layer (e.g., MAC layer) of a UE determines whether a reserved-PUSCH is available (i.e., reserved-PUSCH configuration/activation or release) depending on only presence or absence of UL-SCH data (e.g., TCP-ACK) irrespective of presence or absence of UCI. In this case, the reserved-PUSCH is released when only UCI exists without UL-SCH data (at a transmission timing (e.g., a subframe (SF)), and thus the UE can perform a UL transmission operation including UCI transmission in a state in which the reserved-PUSCH has been excluded (or on the assumption that there is no reserved-PUSCH). This operation may be the same as UL operation of existing UEs when the reserved-PUSCH does not exist. According to the UL operation of existing UEs, UCI is transmitted through a PUSCH when there are allocated PUSCHs at a UCI transmission timing (e.g., SF) whereas the UCI is transmitted through a PUCCH when there is no allocated PUSCH at the UCI transmission timing. Here, in determination of an allocated PUSCH, a PUSCH transmitted through part of a random access procedure (i.e., a PUSCH transmitted according to a UL grant of a random access response message) is excluded. Accordingly, when only the reserved-PUSCH exists in a situation in which only UCI exists without UL-SCH data (at a transmission timing), the reserved-PUSCH is released and UCI feedback may be transmitted through a PUCCH. On the other hand, when only the reserved-PUSCH exists in a situation in which UL-SCH data exists (at the transmission timing), UCI may be transmitted through the reserved-PUSCH.

Alternatively, it is possible to assume that the higher layer (e.g., MAC layer) of the UE determines whether the reserved-PUSCH is available (i.e., reserved-PUSCH configuration/activation or release) depending on presence or absence of UCI as well as presence or absence of UL-SCH data. In this case, the reserved-PUSCH is configured when only UCI exists without UL-SCH data (at the transmission timing), and thus the UE can perform a UL transmission operation including UCI transmission including the reserved-PUSCH. When only the reserved-PUSCH exists in a situation in which only UCI exists without UL-SCH data or only UCI is transmitted through the reserved-PUSCH without UL-SCH data, only UCI signals can be mapped to all symbols/REs (except DMRS transmission symbols/REs) which constitute the reserved-PUSCH irrespective of UCI types (e.g., HARQ-ACK, aperiodic CSI, periodic CSI) of UCI and a combination thereof. Furthermore, when only UCI is transmitted through the reserved-PUSCH without UL-SCH data, a (dummy) UL-SCH data signal is padded in/mapped to reserved-PUSCH resources (e.g., symbols/REs) in accordance with an MCS level and/or a TB size previously set for reserved-PUSCH transmission and then UCI piggybacking on the reserved-PUSCH may be applied in order to prevent inconsistency between an eNB and the UE with respect to presence or absence of UL-SCH data (UCI reception performance deterioration due to the inconsistency). The (dummy) UL-SCH data signal may be configured by padding a specific bit (e.g., 0) in reserved-PUSCH resources (e.g., refer to PUSCH data and CQI/PMI in FIG. 6).

Meanwhile, when a PUSCH instructed to transmit only aperiodic CSI without UL-SCH data (and/or a PUSCH scheduled from a UL grant including an aperiodic CSI request) (referred to as a PUSCH w/o UL-SCH) is present, all pieces of UCI can be transmitted (piggybacked) through the PUSCH w/o UL-SCH. Accordingly, when the PUSCH w/o UL-SCH is present, a UE can operate on the assumption that there is no UCI from the viewpoint of the reserved-PUSCH (e.g., the reserved-PUSCH is released).

(2) Reserved-PUSCH Related Operation When Both UL-SCH Data And UCI Exist

In a situation in which both UL-SCH data (e.g., TCP-ACK) and UCI feedback exist (at transmission timing), the UL-SCH data and UCI can be (multiplexed and) simultaneously transmitted through the reserved-PUSCH. In this case, UL-SCH data transmission performance may deteriorate due to (i) increase in the code rate of the UL-SCH data according to UCI piggybacking on a PUSCH (e.g., rate-matching for CSI and puncturing for HARQ-ACK) and (ii) transmission power reduction of the UL-SCH data (due to power scaling) according to simultaneous transmission of multiple UL signals in power-limited UL carrier aggregation (CA). Accordingly, UL-SCH data transmission may be delayed when PUSCH retransmission needs to be performed. Here, the UL-SCH data may be limited to UL-SCH data that needs to be transmitted with low latency (e.g., TCP-ACK).

In view of the above description, the reserved-PUSCH may be assigned lower selection priority than normal PUSCHs when a PUSCH to be used to transmit UCI (referred to as a UCI PUSCH hereinafter) is determined among a plurality of PUSCHs. Here, the normal PUSCHs refer to PUSCHs (e.g., dynamic-PUSCH and only-PUSCH) other than the reserved-PUSCH. Accordingly, a normal PUSCH instead of the reserved-PUSCH can be selected preferentially/first when the UCI PUSCH is determined. Alternatively, transmission of all pieces of or specific UCI (e.g., CSI) or transmission of UCI having a size exceeding a specific size (e.g., the number of bits) may not be performed through the reserved-PUSCH. Furthermore, the reserved-PUSCH may be assigned higher protection priority than normal PUSCHs (and/or PUCCH) in the case of UL transmission power adjustment (e.g., power scaling) in a power-limited situation. Accordingly, transmission power of normal PUSCHs (and/or PUCCH) instead of the reserved-PUSCH can be reduced preferentially/first in a power-limited situation.

When a dynamic-PUSCH is present, UL-SCH may be transmitted through the dynamic-PUSCH. Accordingly, the priority of this method may be assigned only to the reserved- PUSCH with respect to the only-PUSCH and/or retransmitted PUSCH only. This is because the reserved-PUSCH is released and can coexist only with the only-PUSCH and/or retransmitted PUSCH when the dynamic-PUSCH exists. This can be arranged as shown in Table 5.

TABLE 5

|  | UCI PUSCH | Reserved-PUSCH availability |
| --- | --- | --- |
| When normal PUSCH exists (dynamic PUSCH) | Normal PUSCH | Unavailable (i.e., released) |
| When normal PUSCH exists (except dynamic PUSCH) | Normal PUSCH | Available (i.e., configured) |
| When normal PUSCH does not exist | Reserved-PUSCH | Available (i.e., configured) |

When the reserved-PUSCH and the dynamic-PUSCH coexist, specific UL-SCH data (e.g., TCP-ACK) may be configured to be transmitted through the reserved-PUSCH all the time. In this case, the priority of this method can be assigned to the reserved-PUSCH with respect to all normal PUSCHs including the dynamic-PUSCH. This can be arranged as shown in Table 6.

TABLE 6

|  | UCI PUSCH | Reserved-PUSCH availability |
| --- | --- | --- |
| When normal PUSCH exists | Normal PUSCH | Available (i.e., configured) |
| When normal PUSCH does not exist | Reserved-PUSCH | Available (i.e., configured) |

On the other hand, when a PUSCH scheduled from a UL grant including an aperiodic CSI request (and/or a PUSCH instructed to transmit only aperiodic CSI without UL-SCH data) (referred to as a PUSCH w/o UL-SCH data hereinafter) exists, all pieces of UCI can be transmitted only through the PUSCH w/o UL-SCH. Accordingly, when the PUSCH w/o UL-SCH is present, a UE can operate on the assumption that there is no UCI from the viewpoint of the reserved-PUSCH.

(3) Reserved-PUSCH Release Method When Dynamic PUSCH Is Scheduled

A situation in which a dynamic-PUSCH has been scheduled for a UE for which the reserved-PUSCH has been configured may correspond to a case in which an eNB has received a buffer status report (BSR) or a scheduling request (SR) signal from the UE or the eNB has predicted a UL-SCH data generation and transmission request timing of the UE and scheduled the dynamic-PUSCH at an appropriate timing. In this case, the UE may release the reserved-PUSCH completely or temporarily only for a certain period. On the other hand, when an only-PUSCH and/or a retransmitted PUSCH instead of the dynamic-PUSCH has been scheduled, the UE can maintain the reserved-PUSCH in the configured state thereof without releasing the same.

Additionally, when the dynamic-PUSCH has been scheduled, a period in which the reserved-PUSCH is released may be set differently depending on a reserved-PUSCH available period. For example, when the reserved-PUSCH available period is set to be equal to or shorter than a specific level (e.g., K SFs or K msec), the reserved-PUSCH can be temporarily released only for a certain period. When the reserved-PUSCH available period exceeds the specific level (e.g., K SFs or K msec), the reserved-PUSCH can be completely released.

However, a case in which a PUSCH instructed to transmit only aperiodic CSI without UL-SCH data (and/or a PUSCH scheduled from a UL grant including an aperiodic CSI request) (PUSCH w/o UL-SCH) is present corresponds to a case in which a PUSCH without a UL-SCH transmission region has been scheduled. Accordingly, when the PUSCH w/o UL-SCH has been scheduled, the reserved-PUSCH can be maintained in the configured state thereof without being released.

Although methods (1) to (3) have been independently described for convenience, they may be combined.

Figure 9:
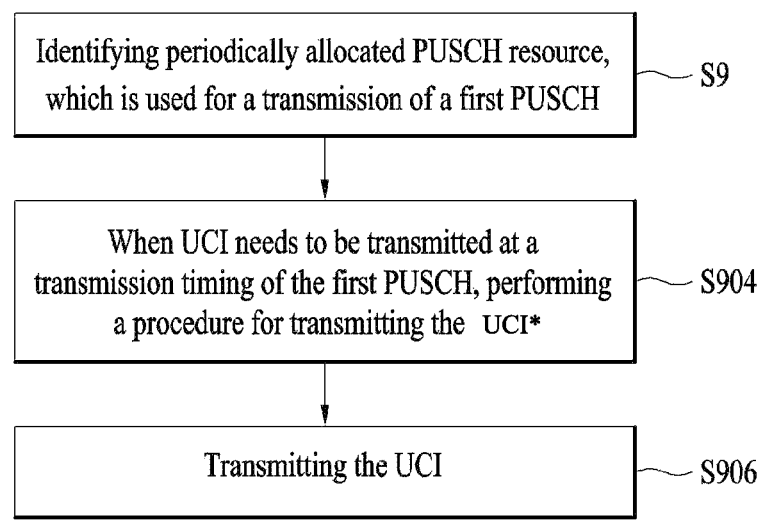
FIG. 9 illustrates a transmission process according to an embodiment of the present invention.

FIG. 9 illustrates a signal transmission process according to the present invention.

Referring to FIG. 9, a UE may acquire a periodically allocated PUSCH resource (S902). Here, the periodically allocated PUSCH resource may be used to transmit a first PUSCH. The first PUSCH may be a PUSCH used to carry information of a first type which requires (only) low latency, for example, a PUSCH used to carry UL-SCH data having (only) TCP-ACK. Then, the UE may perform a procedure for transmitting UCI when the UCI needs to be transmitted at a transmission timing of the first PUSCH (S904). The procedure for transmitting the UCI includes a resource allocation procedure (or channel allocation procedure). Subsequently, the UE may transmit the UCI (S906). Here, when there is no normal PUSCH (e.g., aperiodically allocated second PUSCH) at the transmission timing of the first PUSCH, UCI may be transmitted through the first PUSCH. On the other hand, when there is a normal PUSCH at the transmission timing of the first PUSCH, UCI may be transmitted through the normal PUSCH. For example, the normal PUSCH includes a dynamic-PUSCH, an only-PUSCH, a retransmitted PUSCH, a PUSCH w/o UL-SCH and the like. The range of the normal PUSCH may depend on methods (1) to (3). Although methods (1) to (3) have been independently described for convenience, they may be combined. For example, when TCP-ACK need not be transmitted at the transmission timing of the first PUSCH (and there is no normal PUSCH at the transmission timing of the first PUSCH), the first PUSCH may further include a dummy block/bit corresponding to TCP-ACK. In this case, UCI can be allocated/mapped after the dummy block/bit is allocated/mapped to the first PUSCH (e.g., refer to PUSCH data and CQI/PMI in FIG. 6).

Figure 10:
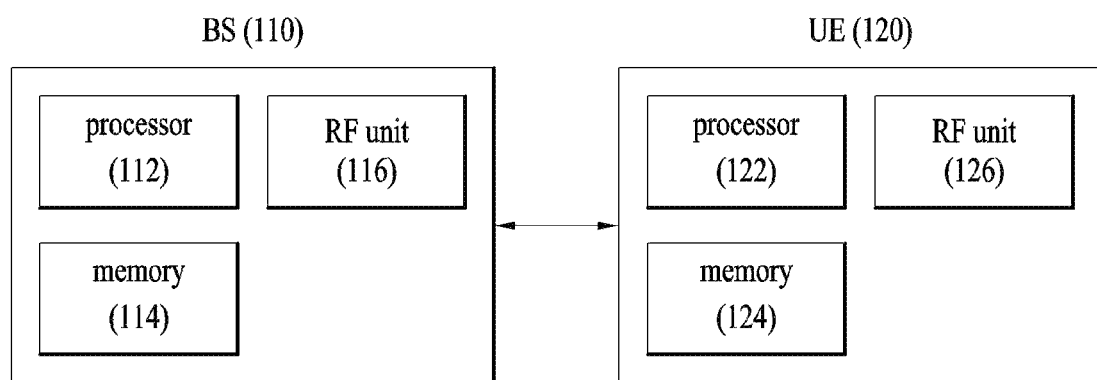
FIG. 10 exemplarily shows a Base Station (BS) and a user equipment (UE) applicable to the embodiments of the present invention.

FIG. 10 illustrates a BS, a relay and a UE applicable to the present invention.

Referring to FIG. 10, a wireless communication system includes a BS 110 and a UE 120. When the wireless communication system includes a relay, the BS or UE may be replaced by the relay.

The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the BS may be performed by an upper node of the BS as the case may be. In other words, it will be apparent that various operations performed for communication with the UE in the network which includes a plurality of network nodes along with the BS may be performed by the BS or network nodes other than the BS. The BS may be replaced with terms such as fixed station, Node B, eNode B (eNB), and access point. Also, the term UE may be replaced with terms such as UE (MS) and mobile subscriber station (MSS).

The embodiments according to the present invention may be implemented by various means, for example, hardware, firmware, software, or combinations thereof. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention is applicable to a UE, BS or other devices of a wireless mobile communication system. Specifically, the present invention is applicable to a method for transmitting uplink control information and an apparatus for the same.

The invention claimed is:

1. A method for a communication device to transmit uplink control information (UCI) in a wireless communication system, the method comprising:
transmitting multiple physical uplink shared channels (PUSCHs), wherein the multiple PUSCHs include a dynamic PUSCH and a pre-configured PUSCH; and
among the dynamic PUSCH and the pre-configured PUSCH, transmitting the UCI through the dynamic PUSCH based on the dynamic PUSCH and the pre-configured PUSCH being transmitted during a same time period.

2. The method of claim 1, wherein the dynamic PUSCH is scheduled by a corresponding uplink grant.

3. The method of claim 1, wherein the pre-configured PUSCH is periodically reserved.

4. The method of claim 3, wherein the pre-configured PUSCH includes a low-latency packet.

5. A communication device for use in a wireless communication system, the communication device comprising:
a memory; and
a processor configured to control the communication device to:
transmit multiple physical uplink shared channels (PUSCHs), wherein the multiple PUSCHs include a dynamic PUSCH and a pre-configured PUSCH, and
among the dynamic PUSCH and the pre-configured PUSCH, transmit uplink control information (UCI) through the dynamic PUSCH based on the dynamic PUSCH and the pre-configured PUSCH being transmitted during a same time period.

6. The communication device of claim 5, wherein the dynamic PUSCH is scheduled by a corresponding uplink grant.

7. The communication device of claim 5, wherein the pre-configured PUSCH is periodically reserved.

8. The communication device of claim 7, wherein the pre-configured PUSCH includes a low-latency packet.

9. A method for a communication device to receive uplink control information (UCI) in a wireless communication system, the method comprising:
receiving multiple physical uplink shared channels (PUSCHs), wherein the multiple PUSCHs include a dynamic PUSCH and a pre-configured PUSCH; and
among the dynamic PUSCH and the pre-configured PUSCH, receiving the UCI through the dynamic PUSCH based on the dynamic PUSCH and the pre-configured PUSCH being received during a same time period.

10. The method of claim 9, wherein the dynamic PUSCH is scheduled by a corresponding uplink grant.

11. The method of claim 9, wherein the pre-configured PUSCH is periodically reserved.

12. The method of claim 11, wherein the pre-configured PUSCH includes a low-latency packet.

13. A communication device for used in a wireless communication system, the communication device comprising:
a memory; and
a processor configured to:
receive multiple physical uplink shared channels (PUSCHs), wherein the multiple PUSCHs include a dynamic PUSCH and a pre-configured PUSCH, and
among the dynamic PUSCH and the pre-configured PUSCH, receive uplink control information (UCI)

through the dynamic PUSCH based on the dynamic PUSCH and the pre-configured PUSCH being transmitted during a same time period.

14. The communication device of claim 13, wherein the dynamic PUSCH is scheduled by a corresponding uplink grant.

15. The communication device of claim 13, wherein the pre-configured PUSCH is periodically reserved.

16. The communication device of claim 15, wherein the pre-configured PUSCH includes a low-latency packet.

* * * * *